US010380591B2

(12) United States Patent
Sharp

(10) Patent No.: US 10,380,591 B2
(45) Date of Patent: Aug. 13, 2019

(54) PRO-ACTIVE IDENTITY VERIFICATION FOR AUTHENTICATION OF TRANSACTION INITIATED VIA NON-VOICE CHANNEL

(71) Applicant: Nuance Communications, Inc., Burlington, MA (US)

(72) Inventor: Robert Douglas Sharp, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 659 days.

(21) Appl. No.: 13/830,238

(22) Filed: Mar. 14, 2013

(65) Prior Publication Data
US 2014/0279514 A1    Sep. 18, 2014

(51) Int. Cl.
*G06F 21/32*    (2013.01)
*H04L 29/06*    (2006.01)
*G06F 21/42*    (2013.01)
*G06Q 20/32*    (2012.01)
*G06Q 20/40*    (2012.01)

(52) U.S. Cl.
CPC ....... *G06Q 20/40145* (2013.01); *G06F 21/32* (2013.01); *G06F 21/42* (2013.01); *G06Q 20/322* (2013.01); *H04L 63/0853* (2013.01); *H04L 63/0861* (2013.01); *H04L 2463/082* (2013.01)

(58) Field of Classification Search
CPC ................................................ G06Q 20/40145
USPC ............................................................. 705/5
See application file for complete search history.

(56) References Cited

U.S. PATENT DOCUMENTS

| 7,158,776 B1* | 1/2007 | Estes ...................... H04L 63/02 380/247 |
| 7,315,510 B1* | 1/2008 | Owens .................. H04L 12/462 370/218 |
| 7,996,324 B2* | 8/2011 | Bishop ................... G06Q 20/00 705/64 |
| 2001/0056359 A1* | 12/2001 | Abreu ................ G06K 7/10861 705/3 |
| 2005/0075985 A1* | 4/2005 | Cartmell ................ G06Q 20/04 705/67 |

(Continued)

FOREIGN PATENT DOCUMENTS

| EP | 2560122 A1 | 8/2012 |
| EP | 2779012 A1 | 3/2014 |

(Continued)

OTHER PUBLICATIONS

European Search Report dated Jun. 2, 2014 for European Application No. EP 14157692 entitled: "Pro-Active Identity Verification for Authentication of Transaction Initiated via Non-Voice Channel".

*Primary Examiner* — Alexander G Kalinowski
*Assistant Examiner* — Paul R Kloberg
(74) *Attorney, Agent, or Firm* — Hamilton, Brook, Smith & Reynolds, P.C.

(57) ABSTRACT

A method of using biometric verification comprises identifying a validation requirement during the execution of a non-voice channel interaction, and initiating a contact to the user, at a pre-registered device. The method further comprises executing a biometric verification of the user's identity and possession of the device, via a user interaction at the pre-registered device, and providing the validation when the user is successfully identified.

19 Claims, 6 Drawing Sheets

(56) References Cited

U.S. PATENT DOCUMENTS

| | | | |
|---|---|---|---|
| 2006/0212407 A1* | 9/2006 | Lyon | G06Q 20/04 705/71 |
| 2007/0050304 A1* | 3/2007 | Smith | G06Q 20/3674 705/67 |
| 2007/0124172 A1* | 5/2007 | Moura | G06Q 10/087 705/2 |
| 2007/0198432 A1* | 8/2007 | Pitroda | G06Q 20/02 705/64 |
| 2008/0046366 A1* | 2/2008 | Bemmel | G06Q 20/20 705/44 |
| 2008/0103972 A1* | 5/2008 | Lanc | G06Q 20/32 705/44 |
| 2008/0167000 A1* | 7/2008 | Wentker | G06Q 20/10 455/408 |
| 2009/0140839 A1* | 6/2009 | Bishop | G06Q 20/10 340/5.85 |
| 2010/0131273 A1* | 5/2010 | Aley-Raz | G10L 17/24 704/247 |
| 2010/0241564 A1* | 9/2010 | Miller | G06Q 20/1085 705/43 |
| 2011/0047605 A1* | 2/2011 | Sontag | G06F 21/32 726/7 |
| 2011/0191166 A1* | 8/2011 | Joa | G06Q 30/02 705/14.45 |
| 2011/0270695 A1* | 11/2011 | Jones | G06Q 20/1085 705/18 |
| 2012/0330765 A1 | 12/2012 | Fried et al. | |

FOREIGN PATENT DOCUMENTS

| | | |
|---|---|---|
| WO | WO 03/001336 A2 | 1/2003 |
| WO | WO 03/001336 A3 | 1/2003 |
| WO | WO 2008/098029 A1 | 8/2008 |

* cited by examiner

PRO-ACTIVE IDENTITY VERIFICATION FOR AUTHENTICATION OF TRANSACTION INITIATED VIA NON-VOICE CHANNEL

FIELD

The present invention is related to validation, and in particular to using pro-active biometric validation.

BACKGROUND

People do not remember passwords. This imposes a cost on secure business transactions of all kinds, both by inhibiting them and by leading to low customer satisfaction. No simple, secure verification capability that does not require a remembered password exists for interactions in non-voice channels, such as text or other types of channels.

One prior art method of providing verification requires the use of a pin number or similar remembered sequence. These are difficult to remember, and relatively easy to crack because the length of such pin numbers tends to be limited due to the user's memory constraints.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present invention provides a way to enable a multi-factor, biometric based validation of a user, for a transaction initiated on a non-voice channel.

A customer may enroll into a validation system when they set up their account, or later. In one embodiment, the customer may be asked to register their cell phone number, or alternatively to download and configure a smartphone or other computer application, so that a correspondence can be established between the customer and either the physical phone or the instance of the application loaded on their device.

As a step in this enrollment, the customer is asked if they would like to use voice verification for authentication when engaging in secure transactions. In one embodiment, they provide their telephone number for the voice verification. In one embodiment, an outbound call is made to the provided telephone number, and the rest of the enrollment dialog takes place through that system. In one embodiment, the customer voiceprint enrollment is performed by calling the telephone number provided.

At some later time, the customer is on a non-voice channel (web, chat, social forum, terminal, kiosk, etc.), and attempts to initiate a secure transaction. For example, they may be trying to make a large payment from a banking web site, which requires strong authentication before it can be authorized. Based on the preference that they configured earlier, rather than ask for a password or shared secret to be typed in, a call is placed to their registered telephone number, or a push notification is sent to the mobile application. In either case, the system triggers a biometric verification dialog to take place. This verification dialog both validates that the customer is in possession of the telephone associated with the provided number, and the biometric based authentication dialog ensures it is the correct customer speaking. This two-factor authentication can therefore be trusted to secure the identity of the customer making the transaction. Because in both cases, the secure connection originated from the enterprise, mobile phone spoofing is removed as a vector for potential fraud.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
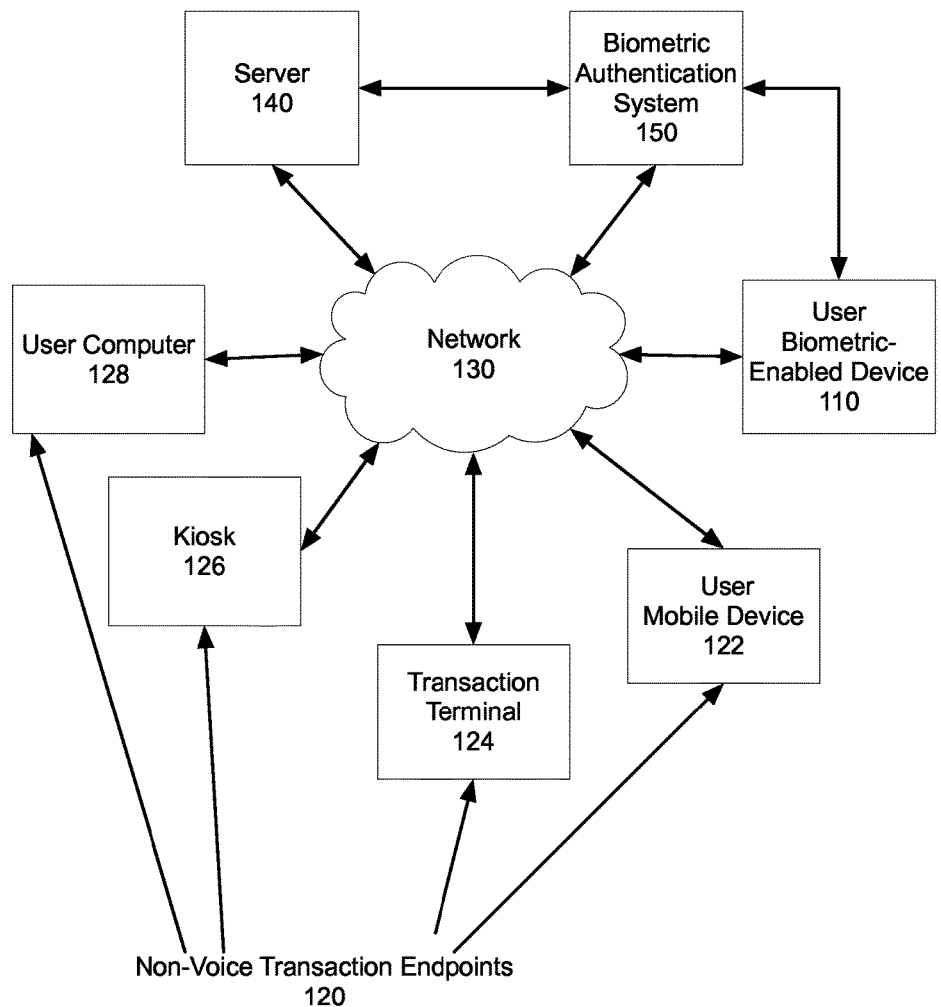
FIG. 1 is a system diagram showing one embodiment of the network, which may implement the present invention.

FIG. 1 is a system diagram showing one embodiment of the network that may implement the present invention. The system includes one or more non-voice transaction endpoints 120 with which the user may initiate a non-voice interaction. These endpoints may include, for example, a user mobile device 122, a transaction terminal 124, a kiosk 126, and a user computer 128. Of course, one or more of these endpoints may also have voice capabilities. However, the system uses them to initiate a non-voice transaction. The transaction may be an access to a bank account, ordering something, paying for something at a terminal, or another transaction.

In one embodiment, the transaction is supported by a server 140. The server 140 may be accessed through network 130. The server 140 may be the banking server, which provides access to the user's bank account, a clearinghouse for validating user transactions, or another application. Although shown as a single block, server 140 may include a plurality of servers, and a plurality of applications, which support the user transaction. The use of servers 140, distributed servers 140, server farms 140, and multiple servers providing transaction assistance. For example, in one embodiment, server 140 may include a server 140 used to interact with an application running on a user mobile device 122, and server 140 used to access a backend database of user data.

When the server 140 determines that a transaction initiated by the user through non-voice transaction endpoint 120 requires biometric authentication, server 140 notifies biometric authentication system 150.

Biometric authentication system 150 may be implemented within server 140, or may be a separate computer system/application/device/cloud implemented mechanism. Biometric authentication system 150 retrieves the biometric data of the user, and initiates a connection to the registered biometric-enabled device 110 associated with the user. In one embodiment, the biometric-enabled device 110 may be the user's mobile device 122, or computer system 128.

The user responds via the user biometric-enabled device 110, in a way that validates the user's identity, via voice biometrics, in one embodiment. The biometric authentication system 150 validates the user's identity using two-factor authentication—the possession of the user biometric-enabled device 110 and the biometric—and passes the authentication data back to server 140. Server 140 can then complete the interaction with the user via non-voice transaction endpoint 120, if needed. In one embodiment, the authentication occurs after all other parts of the transaction are completed, such that the server need not further interact with user's non-voice transaction endpoint 120.

Figure 2:
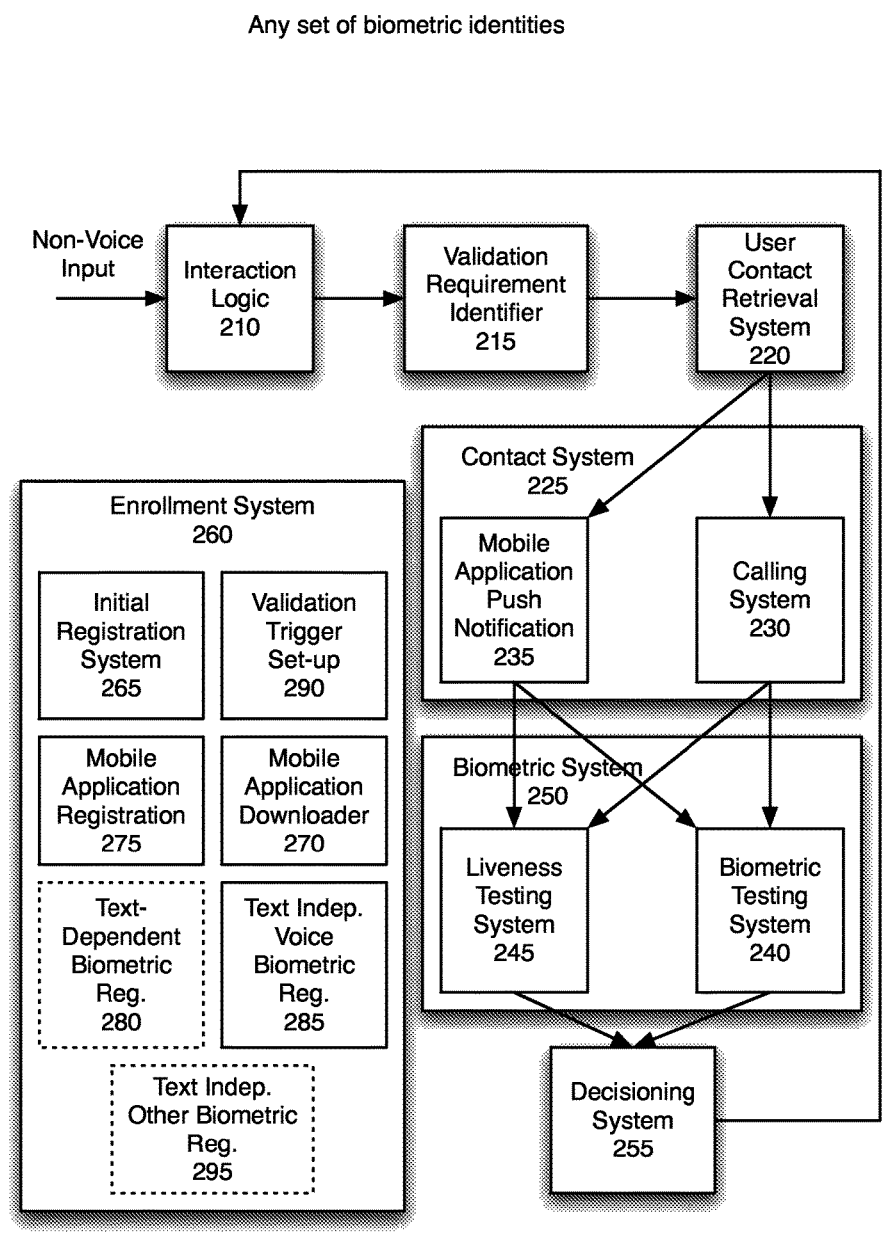
FIG. 2 is a block diagram of one embodiment utilizing voice biometric validation for a non-voice channel initiated transaction.

FIG. 2 is a block diagram of one embodiment utilizing biometric validation for a non-voice channel initiated transaction. The user may interact, using non-voice input, with interaction logic 210. Interaction logic 210 provides functionality that enables the non-voice interaction, and may range from an application providing access to a bank account to a credit card processing system, or a doctors' medical records system.

The validation requirement identifier 215 tracks the interaction requested by user through interaction logic 210, and determines when the user needs to validate himself or herself, e.g. provide positive identification, in the transaction. For example, this may be to authorize a large financial transaction, access sensitive medical records, or otherwise execute a highly secure action. When validation requirement identifier 215 identifies the need for the user to validate, the query is passed to user contact retrieval system 220.

User contact retrieval system 220 identifies the user's registered telephone number, or the application ID associated with the user's registration. Depending on whether the user has a registered number or a registered app, the user contact retrieval system 220 triggers calling system 230 or mobile application push notification 235.

Calling system 230 calls the user's phone number, and requests voice authentication. In one embodiment, biometric testing system 240 executes the actual voice matching algorithm. In one embodiment, the system may further include liveness testing system 245, to ensure the user is speaking to the system live, rather than using a recording of a prior interaction. For example, liveness testing system 245 may request that the user repeat a specified phrase, or perform a similar action that could not have been previously recorded. The liveness testing system verifies, using automated speech recognition, that the user correctly repeated the phrase, and using biometrics technology, that the phrase was said by the registered user. The data from the biometric testing system 240 and liveness system 245 is passed to decisioning system 255, which determines whether the user has successfully verified himself or herself. This information is then passed back to interaction logic 210, enabling a user to complete the transaction only if the user has successfully identified himself or herself.

Mobile application push notification 235 pushes a notification to the user's registered mobile application. The mobile application can interact with the user, and provide data for biometric testing system 240 and liveness testing system 245. Mobile application may utilize voice biometrics, in one embodiment. In one embodiment, the mobile application may additionally or alternatively use other forms of biometric identification, such as face and/or fingerprint. In one embodiment, the mobile application utilizes a data network to interact with the system. In one embodiment, the mobile application may allow interaction through a Voice-over-IP channel or through a cellular network channel, or through other means of transmitting the user's voice data.

Enrollment system 260 permits a user to register for the biometric validation system. The initial registration system 265 associates the user's identity (which may include name, credit card number, and other personal data) with the authentication. The initial registration system 265 may also associate the user's mobile phone number with the user's identity.

In one embodiment, the system also sets up the triggers for validation, using validation trigger set-up 290. In one embodiment, the triggers may be set automatically, without user input. In one embodiment, the user may modify triggers, or set triggers. For example, the user may request that the system do biometric verification if a transaction over a certain dollar amount, or a purchase is being sent to somewhere other than the user's own home address, or access to certain types of data, etc. In one embodiment, there are a default set of triggers, which may be modified by the user at registration. In one embodiment, the triggers may be adjusted by the user after registration as well. These triggers are associated with the registered number and/or application, and used by validation requirement identifier 215.

If the user chooses to utilize a mobile application downloaded to a smartphone or other device, the mobile application downloader provides a copy of the application, and mobile application registration 275 completes registration of the downloaded mobile application. In on embodiment, the unique identifier of the mobile phone or mobile device onto which the application is downloaded becomes part of the user's enrollment data.

The system then completes the registration using text independent voice biometric registration 285, or text dependent biometric registration 280, or text independent other biometric registration 295. Text dependent biometric registration asks a user to repeat a particular phrase multiple times, to have a unique biometric print of the user saying the particular phrase. Text independent voice biometric registration registers the user's voiceprint, such that any sufficiently long phrase or communication by the user is sufficient to identify the user by voice biometric. Text independent other biometric registration 295 registers the user's non-voice biometrics, such as face, fingerprint, etc.

This system, by automatically shifting from a non-voice input to a voice or other biometric-capable channel for verification, provides a painless, nearly real-time validation for high-value transactions.

Figure 3:
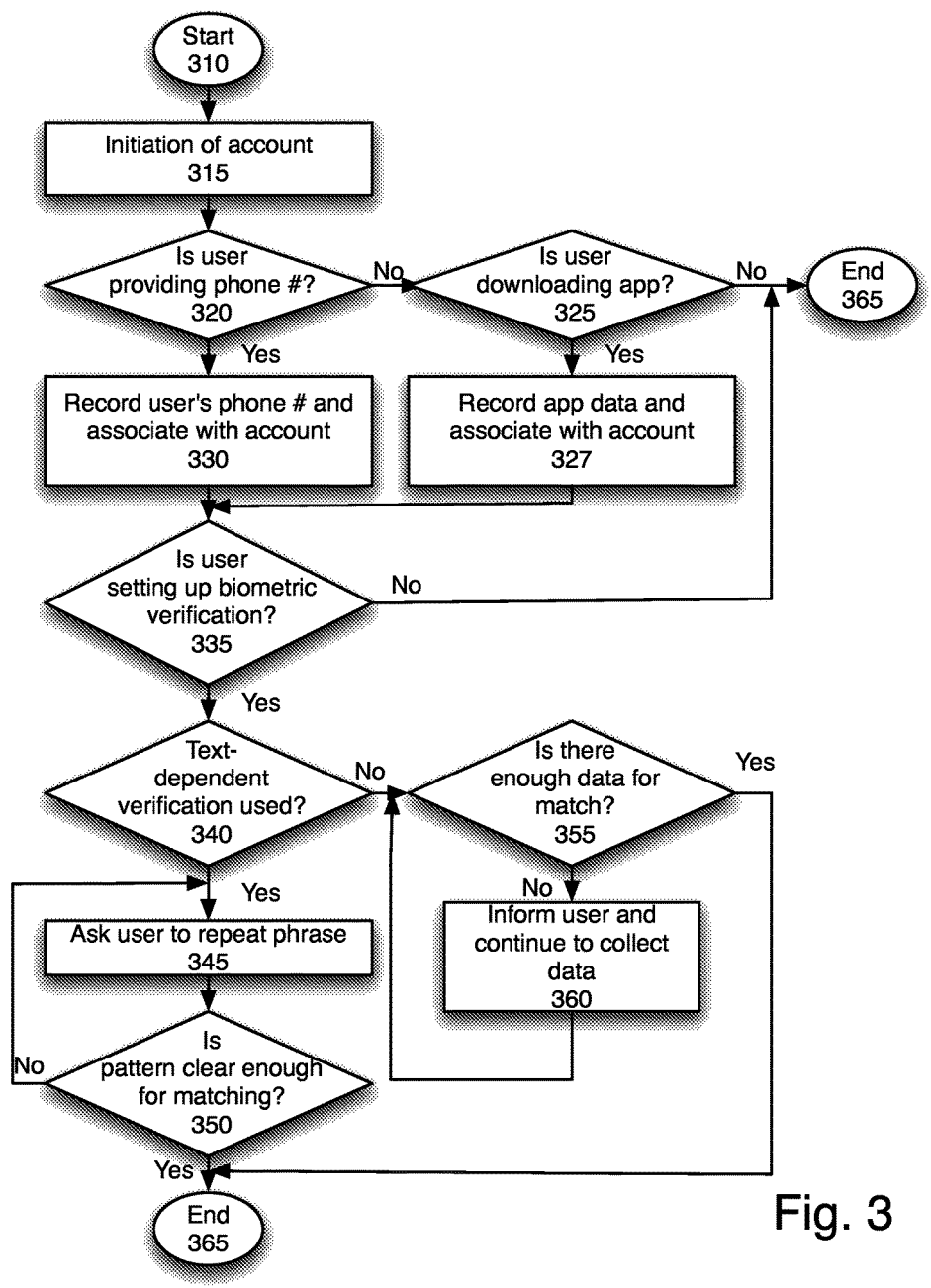
FIG. 3 is a flowchart of one embodiment of enrollment into the system.

FIG. 3 is a flowchart of one embodiment of enrollment into the system. The process starts at block 310. In one embodiment, this process is offered to the user when he or she establishes an account with a company that offers voice verification.

At block 315, the account is initiated. At block 320, the process determines whether the user is setting up a phone number. If so, the process continues to block 330. At block 330, the user's phone number is recorded and associated with the account.

At block 335, the process determines whether the user is setting up a biometric verification. If not, the process ends at block 365.

If the user is setting up biometric verification, at block 340, the process determines whether the user is using text-dependent verification. Text dependent verification uses a particular password or passphrase to match voice biometrics. If so, at block 345, the user is asked to repeat the phrase. In one embodiment, the user is asked to select & repeat a phrase. In one embodiment, if the user selects the phrase, the system may verify that the phrase is long enough to enable validation. In another embodiment, a preset phrase is used.

At block 350, the process determines whether the biometric pattern obtained from the phrase is sufficiently clear for matching. Because people's voices vary slightly with each repetition, multiple repetitions are generally used to ensure that the system will successfully match the user. If there had not been enough repetitions, the process returns to block 345, to ask the user to repeat the phrase again. If there are sufficient repetitions, the process ends at block 365.

If at block 340, it was determined that the system was going to use text-independent verification, the process continues to block 355.

At block 355, the process determines whether the system has enough biometric data for a consistent match with the user. In one embodiment, the biometric data is speech data, and the determination is designed to ensure that the voice can be used for validation, regardless of the words said. In another embodiment, other types of biometric data such as facial biometric, fingerprint biometric, etc. may be obtained.

If there is not sufficient data for validation, at block 360, the user is informed that there is not sufficient data, and prompted to continue providing biometric data. The system continues to collect data, returning to block 365, to determine when sufficient amount of data has been collected. Once sufficient amount of data is collected, the process ends at block 365.

If, at block 320, it was determined that the user was not providing a telephone number, the process continued to block 325.

At block 325, the process determines whether the user is downloading an application. If not, the process ends, at block 365, without the biometric system being enabled.

If the user is downloading an app, at block 325, the process at block 327 records the application's data and associates it with the user's account. The process then continues to block 335, to determine whether the user is setting up the biometric verification.

In this way, the user can register either a number of an application, to provide biometric verification either via text-dependent or text-independent methods. This enables the provision of biometric verification for certain transactions initiated on non-voice channels, thereby enhancing security and improving the user experience.

Figure 4:
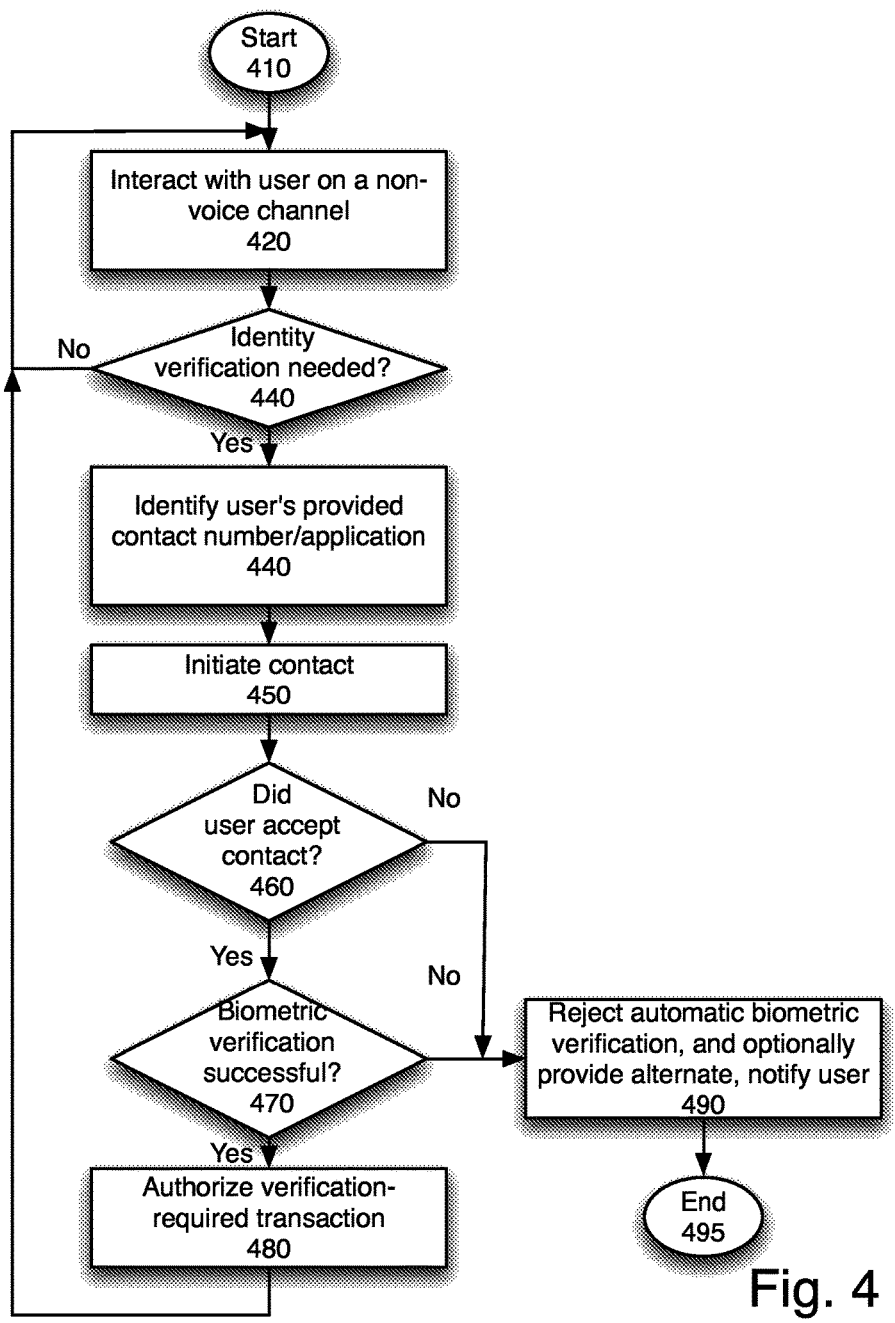
FIG. 4 is a flowchart of one embodiment of using the voice channel validation system.

FIG. 4 is a flowchart of one embodiment of the biometric verification as used. The process starts at block 410.

At block 420, the system interacts with the user through a non-voice channel. The non-voice channel may be on a computer, kiosk, transaction terminal, or other interface.

At block 440, the process determines whether identity verification is needed. If no identification is needed, the system continues to interact with the user through the non-voice channel, at block 420. Of course, if the transaction is complete, the process may end.

If identity verification is needed, the process continues to block 440. At block 440, the system identifies the user's provided contact number or application.

At block 450, the system initiates contact with the user, using the provided path. This may be done by dialing the registered contact number, of pushing a notification to the application to initiate contact.

At block 460, the process determines whether the user accepted the contact. If the user did not accept the contact, the process rejects the automatic transaction validation, at block 490. In one embodiment, an alternative method to perform verification may be provided, such as connecting the user to an agent, or permitting PIN or other validation. In one embodiment, the system notifies the user of the rejection of the transaction. This notification may be through the non-voice channel that was used initially. In one embodiment, the notification may be through another channel. The process then ends at block 495.

If the user accepts the contact, at block 470 the process determines whether the biometric has been successfully validated. If the user biometric was not successfully validated, the process rejects the automatic validation, at block 490. As noted above, the user may be connected to an agent, escalated, or another alternative validation path may be provided. In one embodiment, the system notifies the user of the rejection of the transaction. In one embodiment, the user may be given multiple opportunities to complete the biometric validation, before the system rejects the transaction.

If the user's biometric is successfully validated, at block 480 the transaction is authorized, and the process returns to block 420, to complete the transaction through the non-voice channel.

Figure 5:
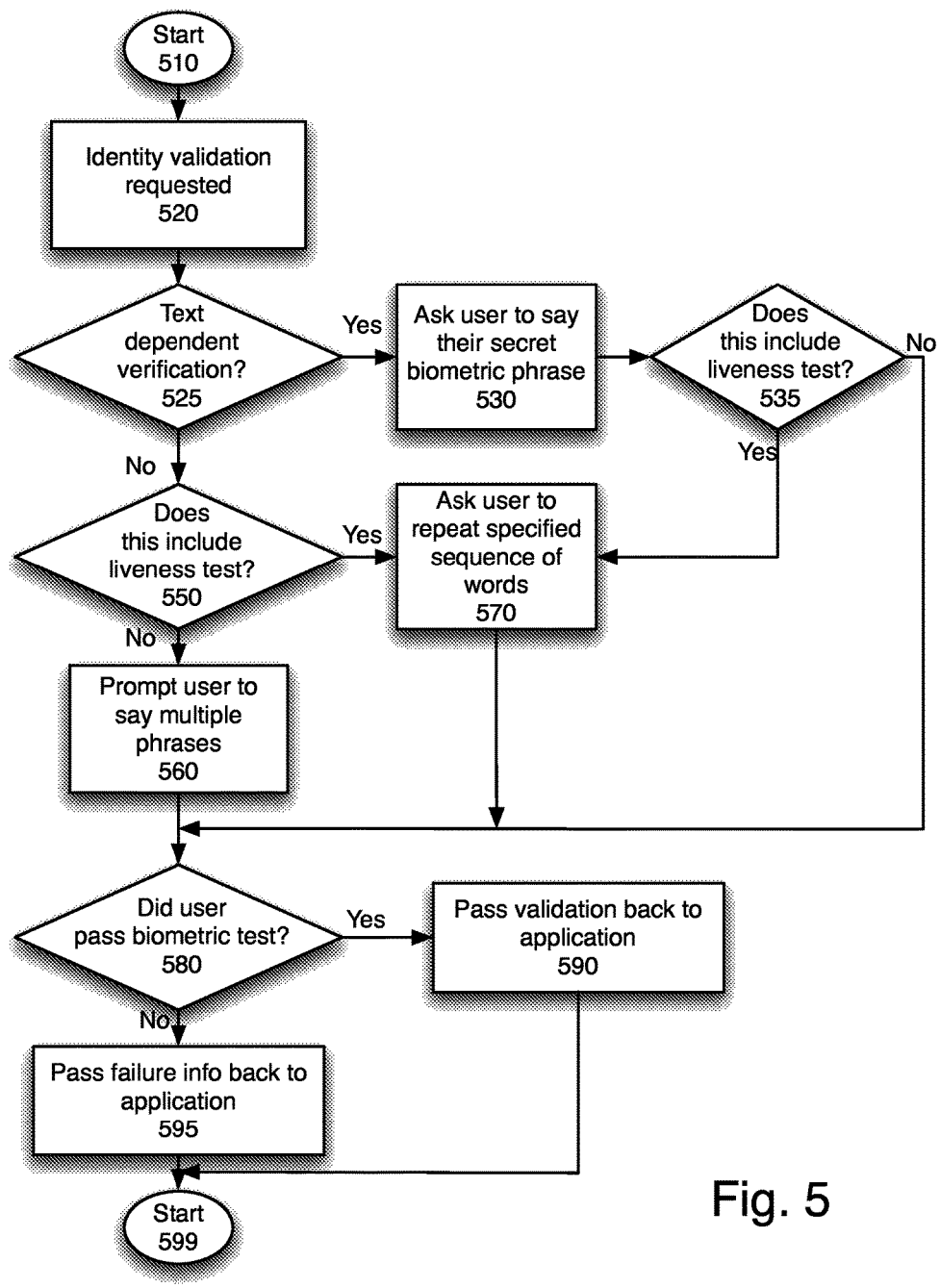
FIG. 5 is a flowchart of one embodiment of the biometric validation.

FIG. 5 is a flowchart of one embodiment of the biometric validation. In one embodiment, this process corresponds to block 335 of FIG. 3.

At block 520, the process determines the type of authorization requested. In one embodiment, authorization requests may specify the level of validation needed, and the type of validation requirements.

At block 525, the process determines whether the validation is text dependent. If so, at block 530 the user is asked to repeat their secret biometric phrase. In another embodiment, the phrase may not be secret, but may be a standard phrase.

At block 535, the process determines whether this verification includes a liveness test. A liveness test ensures that replay attacks cannot work, by prompting the user to say a selected word, phrase, or sequence of nonsense syllables. The liveness test ensures that the user repeats the selected data correctly, and that the person repeating the selected data is the user.

If there is a liveness test, at block 570, the user is asked to repeat a specific sequence of words, syllables, or other sounds. The process then continues to block 580. If there is no liveness test, the process continues directly to block 580.

At block 580, the process determines whether the user passed the biometric test(s) or not. The biometric test includes the user's voice being identified from the secret phrase, and optionally the passing of the liveness test, e.g. a correct repetition of the selected phrase with the voice biometric identifying the user.

If the user passed, at block 590, the information is passed back to the application, to enable the user to complete the transaction. If the user failed, at block 595, the failure information is passed back to the application, thereby terminating the transaction. In one embodiment, if there is a failure, the system may provide one or more additional opportunities for the user to successfully identify themselves, before passing the failure information back. The process then ends at block 599.

If at block 525, the system determined that the verification was not voice dependent, at block 550 the process determines whether the biometric includes a liveness test. If so, the user is asked to repeat a specified sequence of words, at block 570. If not, the user is prompted to say multiple phrases, to provide sufficient voice data for matching, at block 560. The process then continues to block 580, to determine whether the user passed the biometric test.

Figure 6:
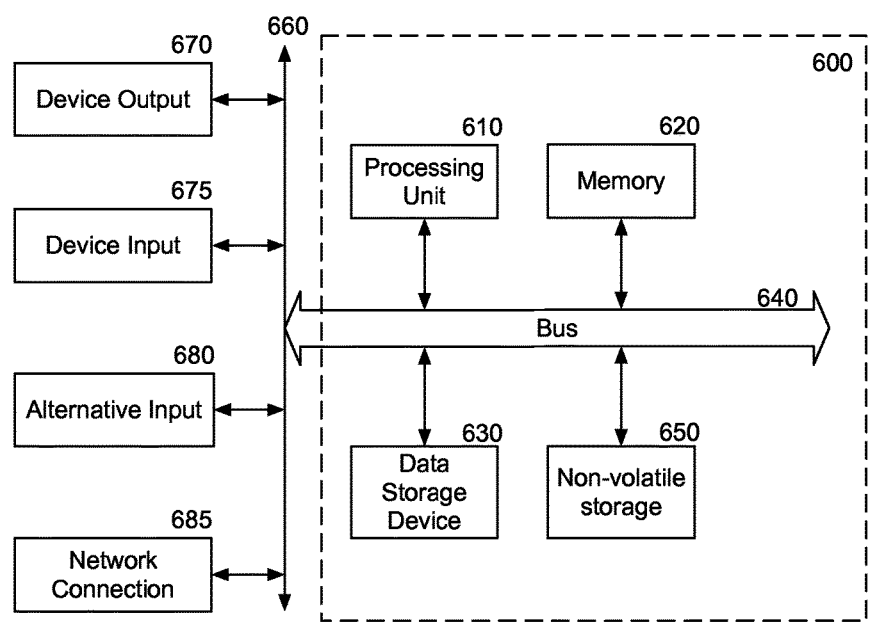
FIG. 6 is a block diagram of one embodiment of a computer system that may be used with the present invention.

FIG. 6 is a block diagram of a particular machine that may be used with the present invention. It will be apparent to those of ordinary skill in the art, however that other alternative systems of various system architectures may also be used.

The data processing system illustrated in FIG. 6 includes a bus or other internal communication means 640 for communicating information, and a processing unit 610 coupled to the bus 640 for processing information. The processing unit 610 may be a central processing unit (CPU), a digital signal processor (DSP), or another type of processing unit 610.

The system further includes, in one embodiment, random access memory (RAM) or other volatile storage device 620 (referred to as memory), coupled to bus 640 for storing information and instructions to be executed by processor 610. Main memory 620 may also be used for storing temporary variables or other intermediate information during execution of instructions by processing unit 610.

The system also comprises in one embodiment a read only memory (ROM) 650 and/or static storage device 650 coupled to bus 640 for storing static information and instructions for processor 610. In one embodiment the system also includes a data storage device 630 such as a magnetic disk or optical disk and its corresponding disk drive, or Flash memory or other storage which is capable of storing data when no power is supplied to the system. Data storage device 630 in one embodiment is coupled to bus 640 for storing information and instructions.

The system may further be coupled to an output device 670, such as a cathode ray tube (CRT) or a liquid crystal display (LCD) coupled to bus 640 through bus 660 for outputting information. The output device 670 may be a visual output device, an audio output device, and/or tactile output device (e.g. vibrations, etc.)

An input device 675 may be coupled to the bus 660. The input device 675 may be an alphanumeric input device, such as a keyboard including alphanumeric and other keys, for enabling a user to communicate information and command selections to processing unit 610. An additional user input device 680 may further be included. One such user input device 680 is cursor control device 680, such as a mouse, a trackball, stylus, cursor direction keys, or touch screen, may be coupled to bus 640 through bus 660 for communicating direction information and command selections to processing unit 610, and for controlling movement on display device 670.

Another device, which may optionally be coupled to computer system 600, is a network device 685 for accessing other nodes of a distributed system via a network. The communication device 685 may include any of a number of commercially available networking peripheral devices such as those used for coupling to an Ethernet, token ring, Internet, or wide area network, personal area network, wireless network or other method of accessing other devices. The communication device 685 may further be a null-modem connection, or any other mechanism that provides connectivity between the computer system 600 and the outside world.

Note that any or all of the components of this system illustrated in FIG. 6 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 620, mass storage device 630, or other storage medium locally or remotely accessible to processor 610.

It will be apparent to those of ordinary skill in the art that the system, method, and process described herein can be implemented as software stored in main memory 620 or read only memory 650 and executed by processor 610. This control logic or software may also be resident on an article of manufacture comprising a computer readable medium having computer readable program code embodied therein and being readable by the mass storage device 630 and for causing the processor 610 to operate in accordance with the methods and teachings herein.

The present invention may also be embodied in a handheld or portable device containing a subset of the computer hardware components described above. For example, the handheld device may be configured to contain only the bus 640, the processor 610, and memory 650 and/or 620.

The handheld device may be configured to include a set of buttons or input signaling components with which a user may select from a set of available options. These could be considered input device #1 675 or input device #2 680. The handheld device may also be configured to include an output device 670 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 610, a data storage device 630, a bus 640, and memory 620, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 685.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method of authenticating a request by initiating biometric based verification, the method comprising:
   at least one processor operatively coupled to computer memory, the at least one processor executing:
   registering a user for biometric based verification, the registering including:
      pre-registering a device of the user and a mobile application configured on the device to utilize biometric based verification;
      collecting biometric data from the user;
      determining whether the collected biometric data contains a biometric pattern that enables identifying the user, and, if not, recollecting biometric data from the user; and
      automatically configuring one or more user-defined triggers of the mobile application, stored in the computer memory, the one or more user-defined triggers configured to initiate the biometric based verification in response to a respective request of the user;
   tracking interaction by the user on a non-voice channel, the tracking identifying a request by the user that matches a trigger of the configured one or more user-defined triggers stored in the computer memory;
   triggering, based on the matched trigger, contact with the biometric based verification via the mobile application configured at the pre-registered device, the triggering sending a mobile application push notification alerting the mobile application configured at the pre-registered device to initiate a voice biometric based verification dialog with the user, the triggering initiating the contact with the biometric based verification to validate the user's identity for a transaction initiated on the non-voice channel, the voice biometric based verification dialog being performed by the mobile application interacting with the user using a form of biometric identification, the biometric based verification: (i) matching biometric data provided during the initiated contact to the collected biometric pattern and (ii) determining possession of the pre-registered device, via the user contact at the pre-registered device; and
   performing the tracked request by the user, in an event the user is successfully identified.

2. The method of claim 1, wherein initiating the contact comprises calling the user at a telephone number associated with the pre-registered device.

3. The method of claim 1, wherein the non-voice channel interaction comprises one of: a web interaction, an instant messaging interaction, a texting interaction, an interaction via a terminal, a payment interaction, or an interaction at a kiosk.

4. The method of claim 1, wherein the biometric verification comprises one or more of: a text dependent biometric validation, a text-independent biometric validation, and a liveness test.

5. The method of claim 1, further comprising enabling the registration for the biometric verification by one of: a telephone number associated with the pre-registered device and downloading of an application to the pre-registered device.

6. The method of claim 5, wherein the registration is completed using the pre-registered device, by registering the user's voice print via the pre-registered device.

7. A biometric authentication system comprising:
   at least one processor operatively coupled to computer memory, the at least one processor configured to include:
   an enrollment system configured to register a user for biometric based verification, the enrollment system configured to pre-register a device of the user and a mobile application configured on the device to utilize biometric based verification, collect biometric data from the user, determine whether the collected biometric data contains a biometric pattern that enables identifying the user, and, if not, recollect biometric data from the user, and configure one or more user-defined triggers of the mobile application, stored in the computer memory, the one or more user-defined triggers configured to initiate the biometric based verification in response to a respective request of the user;
   a validation requirement identifier configured to track interaction by the user on a non-voice channel, the tracking identifying a request by the user that matches a trigger of the configured one or more user-defined triggers stored in the computer memory;
   a contact system configured to, based on the matched trigger, trigger contact with the biometric based verification via the mobile application configured at the pre-registered device, the contact system further configured to push a notification triggering the contact with the biometric based verification by alerting the mobile application configured at the pre-registered device to initiate a voice biometric based verification dialog with the user;
   a biometric system configured to perform the biometric based verification of the user's identity for a transaction initiated on the non-voice channel, the voice biometric based verification dialog being performed by the mobile application interacting with the user using a form of biometric identification, the biometric based verification: (i) matching biometric data provided during the initiated contact to the collected biometric pattern and (ii) determining possession of the pre-registered device, via the user contact at the pre-registered device; and
   a decisioning system configured to validate performing the request by the user in an event the user is successfully identified.

8. The biometric authentication system of claim 7, further comprising:
   a calling system configured to initiate contact by calling the user at a telephone number associated with the pre-registered device.

9. The biometric authentication system of claim 7, wherein the non-voice channel interaction comprises a web interaction, an instant messaging interaction, a texting interaction, an interaction via a terminal, a payment interaction, and an interaction at a kiosk.

10. The biometric authentication system of claim 7, wherein the biometric verification comprises one or more of: a text dependent biometric validation, a text-independent biometric validation, and a liveness test.

11. The biometric authentication system of claim 7, further comprising:
    the enrollment system configured to enable the registration for the biometric verification by one of: a telephone number associated with the pre-registered device, and downloading of an application to the pre-registered device.

12. The biometric authentication system of claim 11, wherein the registration is completed using the pre-registered device, by registering the user's voice print via the pre-registered device.

13. A system comprising:
at least one processor operatively coupled to computer memory, the at least one processor configured to include:
an enrollment system configured to register a user for biometric based verification, the registering including pre-registering a device of the user and a mobile application configured on the device to utilize biometric based verification, collecting biometric data from the user, determining whether the collected biometric data contains a biometric pattern that enables identifying the user, and, if not, recollecting biometric data from the user, and configuring one or more user-defined triggers of the mobile application stored in the computer memory, the one or more user-defined triggers configured to initiate the biometric based verification in response to a respective transaction by the user;
a non-voice channel configured to initiate a transaction with the user;
a biometric authentication system configured to determine that the transaction with the user matches a trigger of the configured one or more user-defined triggers stored in the computer memory, the biometric authentication system comprising:
 a contact system configured to, based on the matched user-defined trigger, initiate contact with the biometric based verification via triggering the mobile application configured at the pre-registered device interacting with the user, the contact system further configured to push a notification triggering the contact with the biometric based verification by alerting the mobile application configured at the pre-registered device to initiate a voice biometric based verification dialog with the user;
 a biometric system configured to perform the biometric verification of the user's identity for a transaction initiated on a non-voice channel, the voice biometric based verification dialog being performed by the mobile application interacting with the user using a form of biometric identification, the biometric based verification: (i) matching biometric data provided during the initiated contact to the collected biometric pattern and (ii) determining possession of the pre-registered device, via the user contact at the pre-registered device; and
 a decisioning system configured to validate completing the transaction by the user in an event the user is successfully identified; and
the non-voice channel configured to complete the transaction in an event the decision system indicates that the user is successfully identified.

14. The system of claim 13, further comprising:
a calling system configured to initiate contact by calling the user at a telephone number associated with the pre-registered device.

15. The system of claim 13, wherein the non-voice channel comprises one of: a web interaction, an instant messaging interaction, a texting interaction, an interaction via a terminal, a payment interaction, and an interaction at a kiosk.

16. The system of claim 13, further comprising:
the enrollment system configured to enable the registration of the user into the biometric authentication system, wherein the registration is completed using the pre-registered device, by registering the user's voice print via the pre-registered device.

17. The method of claim 1, wherein confirming the collected biometric data includes at least one of: verifying that length of a phrase comprising voice biometric data enables validation with a live voice of the user, verifying that clarity of a phrase pattern comprising voice biometric data enables validation with a live voice of the user, and verifying that the collected biometric data contains a variety of phrases to enable validation with a live voice of the user.

18. The biometric authentication system of claim 7, wherein the enrollment system, when configured to confirm the collected biometric data contains a biometric pattern that enables identifying the user, is further configured to perform at least one of the following operations: verify that length of a phrase comprising voice biometric data enables validation with a live voice of the user, verify that clarity of a phrase pattern comprising voice biometric data enables validation with a live voice of the user and verify that the collected biometric data contains a variety of phrases to enable validation with a live voice of the user.

19. The system of claim 13, wherein the enrollment system, in confirming the collected biometric data contains a biometric pattern that enables identifying the user, is further configured to perform at least one of the following operations: verify that length of a phrase comprising voice biometric data enables validation with a live voice of the user, verify that clarity of a phrase pattern comprising voice biometric data enables validation with a live voice of the user and verify that the collected biometric data contains a variety of phrases to enable validation with a live voice of the user.

* * * * *